United States Patent [19]

Suzuki

[11] Patent Number: 5,521,892
[45] Date of Patent: May 28, 1996

[54] CLOSED-LOOP CONTROL SYSTEM AND SERVO DEVICE OF OPTICAL DISK UNIT

[75] Inventor: Haruyuki Suzuki, Yokohama, Japan

[73] Assignee: Ricoh Company, Ltd., Tokyo, Japan

[21] Appl. No.: 385,734

[22] Filed: Feb. 8, 1995

Related U.S. Application Data

[63] Continuation of Ser. No. 51,041, Apr. 21, 1993, abandoned.

[30] Foreign Application Priority Data

May 1, 1992 [JP] Japan ................................. 4-139748

[51] Int. Cl.⁶ .................................................. G11B 7/00
[52] U.S. Cl. ................................ 369/44.36; 369/44.25; 369/44.29
[58] Field of Search .................... 369/32, 44.27, 369/44.28, 44.29, 44.35, 44.26, 44.32, 44.36, 54, 48, 44.25; 360/77.01, 77.04, 78.04

[56] References Cited

U.S. PATENT DOCUMENTS

| | | | |
|---|---|---|---|
| 4,682,315 | 7/1987 | Uejima | 369/44.28 |
| 4,817,069 | 3/1989 | Shigemori | 369/44.29 |
| 4,817,073 | 3/1989 | Suzuki | 365/44.29 |
| 4,873,678 | 10/1989 | Nakamura et al. | 369/13 |
| 4,878,211 | 10/1989 | Suzuki et al. | 369/44.35 |
| 4,888,755 | 12/1989 | Itoh | 369/44.28 |
| 4,954,908 | 9/1990 | Sengoku | 360/78.04 |
| 5,048,002 | 9/1991 | Horie et al. | 369/44.35 |
| 5,060,212 | 10/1991 | Fujita et al. | 369/44.12 |
| 5,070,494 | 12/1991 | Emoto et al. | 369/112 |
| 5,073,888 | 12/1991 | Takahashi et al. | 369/44.13 |
| 5,084,848 | 1/1992 | Deguchi et al. | 369/44.35 |
| 5,084,851 | 1/1992 | Noda et al. | 369/44.24 |
| 5,095,476 | 3/1992 | Greve et al. | 369/44.28 |
| 5,097,458 | 3/1992 | Suzuki | 369/44.35 |
| 5,105,410 | 4/1992 | Maeda et al. | 369/44.37 |
| 5,121,372 | 6/1992 | Tominaga | 369/44.32 |
| 5,128,917 | 7/1992 | Kiyoshi | 369/44.35 |
| 5,146,443 | 9/1992 | Iwase et al. | 369/44.35 |
| 5,189,651 | 2/1993 | Utsumi | 369/13 |
| 5,210,732 | 5/1993 | Suenaga et al. | 369/44.35 |
| 5,218,588 | 6/1993 | Suzuki | 369/44.27 |
| 5,222,057 | 6/1993 | Suzuki et al. | 369/44.26 |
| 5,233,586 | 8/1993 | Morisada | 369/44.36 |
| 5,287,234 | 2/1994 | Suzuki | 360/78.06 |
| 5,341,355 | 8/1994 | Gotoh et al. | 369/44.24 |

FOREIGN PATENT DOCUMENTS

| | | |
|---|---|---|
| 1-92802 | 4/1989 | Japan. |
| 1-169603 | 7/1989 | Japan. |
| 2-33731 | 2/1990 | Japan. |
| 2-192036 | 7/1990 | Japan. |

*Primary Examiner*—Nabil Z. Hindi
*Attorney, Agent, or Firm*—Cooper & Dunham

[57] ABSTRACT

In a closed-loop control system and a servo device of an optical disk unit, a loop gain can be suitably corrected by a simplified structure. A signal is added to a closed loop and a value having a correlation with a gain of the closed loop is measured in accordance with the added signal. The loop gain is changed such that the measured value is equal to a predetermined value. Therefore, it is possible to suitably correct the loop gain.

5 Claims, 6 Drawing Sheets

Fig. 7

| Loop No. | GAIN | LPG | TEP |
|---|---|---|---|
| 1 | 1 | 15 | 2 |
| 2 | 0.8 | 12 | 1.4 |
| 3 | 0.72 | 10.8 | 1.16 |
| 4 | 0.69 | 10.32 | 1.064 |
| 5 | 0.677 | 10.16 | 1.031 |
| 6 | 0.670 | 10.06 | 1.012 |
| ⋮ | ⋮ | ⋮ | ⋮ |
| ∞ | 0.6666... | 10 | 1 |

Fig. 8

| GAIN | LPG | NOISE | TEP |
|---|---|---|---|
| 1 | 15 | +0.1 | 2.1 |
| 0.78 | 11.7 | −0.1 | 1.24 |
| 0.732 | 10.98 | +0.1 | 1.296 |
| 0.673 | 10.10 | −0.1 | 0.919 |
| 0.689 | 10.34 | +0.1 | 1.168 |
| 0.655 | 9.83 | −0.1 | 0.867 |
| 0.681 | 10.23 | +0.1 | 1.145 |
| 0.652 | 9.78 | −0.1 | 0.856 |
| 0.680 | 10.21 | | |
| ⋮ | ⋮ | ⋮ | ⋮ |

CLOSED-LOOP CONTROL SYSTEM AND SERVO DEVICE OF OPTICAL DISK UNIT

This is a continuation of application Ser. No. 08/051,041 filed Apr. 21, 1993 now abandoned.

BACKGROUND OF THE INVENTION

1. Field of the Invention

The present invention relates to a servo device of an optical disk unit for optically recording and reproducing information and an improvement of a servo system using all closed-loop control systems. More particularly, the present invention relates to a closed-loop control system and a servo device of an optical disk unit for suitably correcting a loop gain by using a simple structure.

2. Description of the Related Art

A general optical disk unit for optically recording and reproducing information has a known tracking servo controller for exactly making a light beam follow up an information track on an optical disk. For example, such a tracking servo controller is shown in Japanese Patent Application Laying Open (KOKAI) No. 2-192036.

An overshooting amount of a servo gain is increased when the servo gain is greater and smaller than an optimum value. Accordingly, there is a case in which no servo gain can be set to the optimum value from the above overshooting amount.

Further, it takes time to find and recorrect servo retracting timing when the servo gain is repeatedly set until the optimum value of the servo gain can be obtained.

In this general tracking servo controller, signal components mixed into a measured tracking error signal are simultaneously measured when the tracking error signal is measured. For example, these signal components are constructed by a track eccentric component, a disturbance vibrating component, a signal component disturbed by an address section of the optical, disk, other noises, etc. Therefore, it is impossible to suitably correct the servo gain by the simultaneous measurement of such signal components.

The inventors of this patent application proposed a servo circuit of a disk unit as one method for solving such a problem of the tracking servo controller.

In this servo circuit, a signal having a predetermined frequency is added to a servo loop and a servo loop gain is corrected by using amplitude ratios before and after this addition.

In the above servo circuit, the loop gain can be suitably corrected, but it is necessary to dispose a means for generating a signal having a specified frequency.

Therefore, there is a problem that the construction of the servo circuit is slightly complicated.

SUMMARY OF THE INVENTION

It is therefore an object of the present invention to provide a closed-loop control system and a servo device of an optical disk unit in which the above-mentioned problems in the servo device of the general optical disk unit and the proposed servo circuit are solved and a loop gain can be suitably corrected by a simple structure.

In accordance with a first structure of the present invention, the above object can be achieved by a closed-loop control system for controlling the position of a control object such that the control object approaches a target position thereof in accordance with a shifting amount of the control object from the target position; the closed-loop control system comprising additional means for adding a signal to a closed loop; means for measuring a value having a correlation with a gain of the closed loop in accordance with the added signal; and gain variable means for changing the loop gain such that the measured value is equal to a predetermined value.

In the closed-loop control system having the first structure of the present invention, the measuring means measures a value obtained by adding a signal to the closed loop. Namely, the measuring means measures a value having a correlation with the loop gain. The loop gain is changed such that the measured value is equal to a predetermined value. Accordingly, it is possible to suitably correct the loop gain.

In accordance with a second structure of the present invention, the closed-loop control system further comprises accumulative means for comparing the measured value obtained by the measuring means with the predetermined value and accumulating compared results at a predetermined ratio, and the gain variable means changes the loop gain in accordance with the accumulated results of the accumulative means.

In the closed-loop control system having the second structure of the present invention, the measuring means measures a value obtained by adding a signal to the closed loop and having a correlation with the loop gain. The loop gain is changed in accordance with accumulated results of a difference between the measured value and the predetermined value. Accordingly, it is possible to suitably correct the loop gain even when an error in the measured value is caused by noises, etc.

The above object of the present invention can be also achieved by a servo device of an optical disk unit for positioning a light beam in a target position on an optical disk; the servo device comprising an optical head for providing an error signal in accordance with an error in position of the light beam from the target position; closed-loop control means for controlling the position of the light beam in accordance with the error signal; additional means for adding a signal to a closed loop; means for measuring a value having a correlation with a gain of the closed loop from the error signal in accordance with the added signal; and gain variable means for changing the loop gain such that the measured value is equal to a predetermined value.

In the servo device of the optical disk unit in the present invention, the measuring means measures a value obtained by adding a signal to the closed loop. Namely, the measuring means measures a value having a correlation with the loop gain. The loop gain is changed such that the measured value is equal to a predetermined value. Accordingly, it is possible to suitably correct the loop gain so that the servo device can be operated stably and reliably.

Namely, in each of the closed-loop control system and the servo device of the optical disk unit. In the present invention, the measuring means measures a value obtained by adding a signal to the closed loop. Namely, the measuring means measures a value having a correlation with the loop gain. The loop gain is changed such that the measured value is equal to a predetermined value. Accordingly, it is possible to suitably correct the loop gain.

In this case, the loop gain can be suitably corrected even when an error in the measured value is caused by noises, etc. The operation of an open loop is controlled by using correction results of the loop gain. The additional means has a simplified structure and the measuring means measures a shift in position of the light beam within a predetermined time after the additional means is operated.

Further objects and advantages of the present invention will be apparent from the following description of the preferred embodiments of the present invention as illustrated in the accompanying drawings.

BRIEF DESCRIPTION OF THE DRAWINGS

FIG. 7 is a table showing an operating example of each of a closed-loop control system and the servo device in the present invention every one loop using algorithm thereof;

FIG. 8 is a table showing one example of operating simulation results of algorithm shown in FIG. 2 when a noise is mixed into the tracking error signal TE providing a measured value of the peak level TEP;

DESCRIPTION OF THE PREFERRED EMBODIMENTS

The preferred embodiments of a closed-loop control system and a servo device of an optical disk unit in the present invention will next be described in detail with reference to the accompanying drawings.

Figure 1:
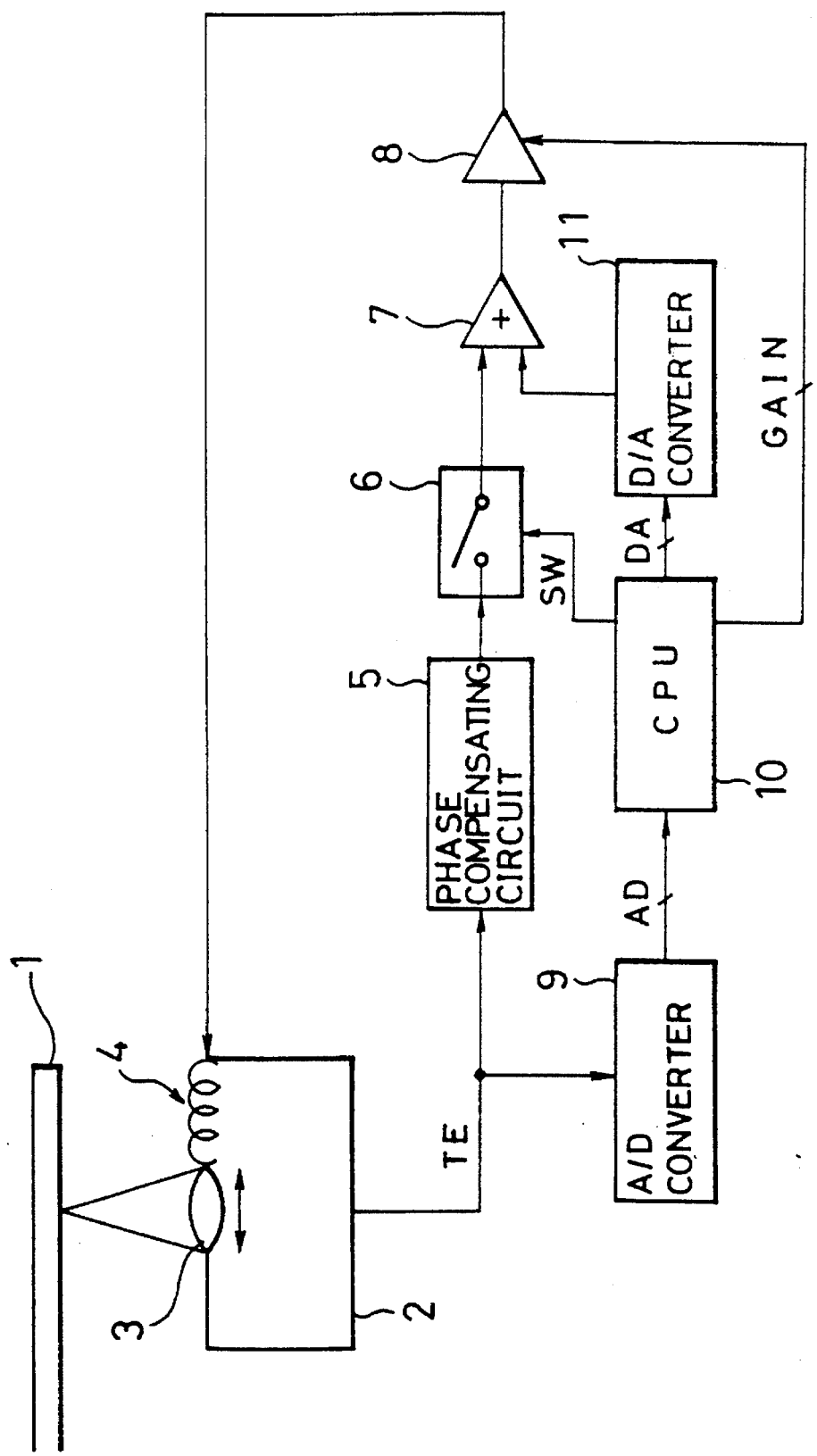
FIG. 1 is a functional block diagram showing a servo device of an optical disk unit in accordance with one embodiment of the present invention.

FIG. 1 is a functional block diagram showing a main construction of a servo device of an optical disk unit in accordance with a first embodiment of the present invention. In FIG. 1, reference numerals 1, 2 and 3 respectively designate an optical disk, an optical head and an objective lens. Reference numerals 4, 5 and 6 respectively designate an actuator, a phase compensating circuit and a switching circuit. Reference numerals 7, 8 and 9 respectively designate an adder, an amplifier and an A/D converter. Reference numerals 10 and 11 respectively designate a central processing unit (CPU) and a D/A converter. Reference numerals TE, AD and DA respectively designate a tracking error signal, a digital input signal and a digital output command signal. Further, reference numerals SW and GAIN respectively designate a switching control signal and a gain control command signal.

In the servo device of the optical disk unit of the present invention shown in FIG. 1, a servo operation common to that of the general servo device will first be explained.

The optical disk 1 is rotated by an unillustrated spindle motor.

A light beam is converged and irradiated onto the optical disk 1 by an unillustrated optical system and the objective lens 3 to record, reproduce and erase information from the optical disk 1.

Concretely, the objective lens 3 is arranged on the optical head 2 such that a position of the objective lens 3 can be slightly displaced by the actuator 4.

A tracking error signal TE is outputted from the optical head 2 by the relation in position between the light beam and a track of the optical disk 1 thereon.

In general, the tracking error signal TE shows a shifting amount of the light beam from the track. A voltage of the tracking error signal TE is equal to zero when the light beam is located on the track.

This tracking error signal TE is transmitted to the known phase compensating circuit 5. When the switching circuit 6 at the next stage is turned on, the actuator 4 is driven through the adder 7 and the amplifier 8 to control a positioning operation of the light beam such that the light beam follows up the track.

A servo loop for moving the objective lens 3 performs the above-mentioned operation.

In a servo circuit shown in FIG. 1, the tracking error signal TE is simultaneously transmitted to the A/D converter 9 for converting the tracking error signal TE to a digital output signal AD. The digital output signal AD is outputted to the central processing unit (CPU) 10 so that a voltage level of the tracking error signal TE can be known at this time.

The digital output command signal DA generated from the CPU 10 is converted to an analog signal by the D/A converter 11 and is inputted to one input terminal of the adder 7.

A gain of the amplifier 8 is changed by a gain command signal GAIN.

Similarly, turning-on and turning-off operations of the switching circuit 6 are controlled by a switching control signal SW.

The above construction and operation of the servo device in the present invention are similar to those of the general servo device except for control of the CPU 10.

Figure 2:
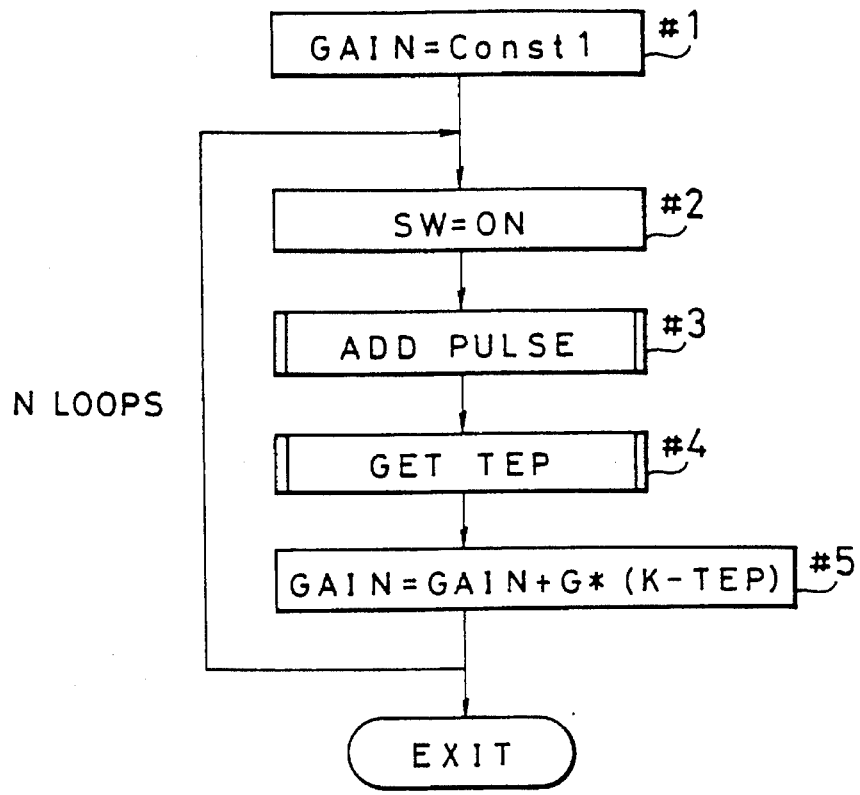
FIG. 2 is a flow chart showing a main processing flow at a loop gain control time of a central processing unit (CPU) 10 in the servo device of the present invention.

In the servo device of the present invention, the CPU 10 controls a loop gain in accordance with algorithm shown in FIG. 2.

FIG. 2 is a flow chart showing a main processing flow of the servo device at a time of the loop gain control using the CPU 10 in the present invention. In FIG. 2, reference numerals #1 to #5 designate steps of the processing flow.

In the step #1, a loop gain GAIN is set to a constant Const1.

This constant Const1 is set to a value preset such that the loop gain in a track follow-up servo in the servo circuit shown in FIG. 1 is equal to a suitable value when there is no dispersion in each of gains of constructional elements of a servo loop.

In the next step #2, the switching control signal SW is set to a turning-on signal so that the track follow-up servo attains a closing state. In this closing state, a light spot follows up a track.

Figure 3:
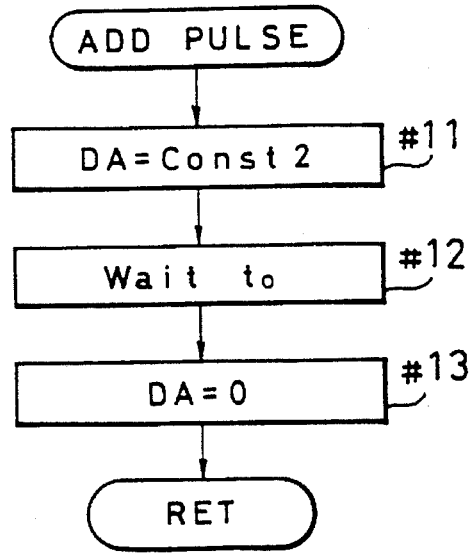
FIG. 3 is a flow chart showing a detailed processing flow of a subroutine "ADD PULSE" shown in FIG. 2.

In the step #3, a pulse is outputted to the D/A converter 11 for a constant time $t_0$ in accordance with a subroutine "ADD PULSE". FIG. 3 shows contents of the subroutine "ADD PULSE".

Figure 4:
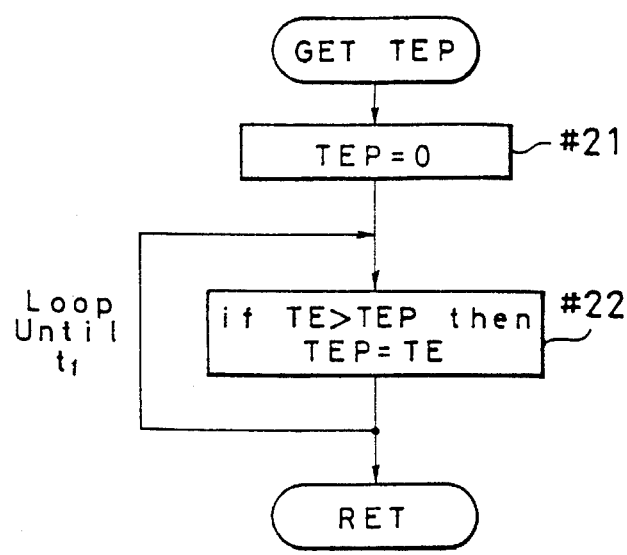
FIG. 4 is a flow chart showing a detailed processing flow of a subroutine "GET TEP" shown in FIG. 2.

In the step #4, a peak voltage value TEP of the tracking error signal TE within a constant time $t_1$ is obtained as information TEP in accordance with a subroutine "GET TEP". FIG. 4 shows contents of this subroutine "GET TEP".

In the step #5, the loop gain GAIN is calculated by the following formula (1) using the information TEP obtained in the above step #4.

$$GAIN=GAIN+G*(K-TEP) \tag{1}$$

In this formula (1), reference numeral K is set to a constant and means a convergent target value of this algorithm. A value of the gain GAIN is changed such that TEP=K is formed by N loops where N is an integral number equal to or greater than two.

In the formula (1), reference numeral G is also set to a constant and determines a sensitivity of this algorithmic loop.

These constants K and G will be described later in detail.

In the flow chart shown in FIG. 2, after the gain calculation in the formula (1) is made in the step #5, it is returned to the previous step #2 and the above processing operation is then repeatedly performed. After the above processing operation is repeatedly performed by the predetermined number N, execution of this processing flow is terminated.

The value of the loop gain GAIN is determined by the above processings in the steps #1 to #5.

The subroutine "ADD PULSE" executed in the step #3 in FIG. 2 will next be explained.

FIG. 3 shows a flow chart showing a detailed processing flow of the subroutine "ADD PULSE". In FIG. 3, reference numerals #11 to #13 designate processing steps.

In the step #11, a value shown by the digital output command signal DA is set to a constant Const2.

In the next step #12, the servo device waits for a constant time $t_0$. In the next step #13, the value shown by the digital output command signal DA is set to zero and execution of the processing flow shown in FIG. 3 is terminated.

The subroutine "ADD PULSE" is executed by the above processings in the steps #11 to #13. Thus, a pulse is outputted to the D/A converter 11 for a constant time $t_0$.

The subroutine "GET TEP" executed in the step #4 in FIG. 2 will next be explained.

FIG. 4 shows a flow chart showing a detailed processing flow of the subroutine "GET TEP". In FIG. 4, reference numerals #21 and #22 designate processing steps.

In the step #21, a peak voltage value TEP of the tracking error signal TE is set to zero.

In the step #22, a peak voltage value of the tracking error signal TE as information is compared with the peak value TEP to judge whether TE>TEP is formed or not.

If TE>TEP is formed, TEP=TE is set and the processing operation in this step #22 is repeatedly performed until a preset constant time $t_1$ has passed.

When the constant time $t_1$ has passed, the peak voltage value of the tracking error signal TE is set to the peak value TEP from TEP=TE and execution of this processing flow in FIG. 4 is terminated.

Information of the peak voltage value TEP of the tracking error signal TE can be obtained by the above processings in the steps #21 and #22.

The relation between the digital output command signal DA and the tracking error signal TE will next be explained when the subroutine "ADD PULSE" is executed.

Figure 5:
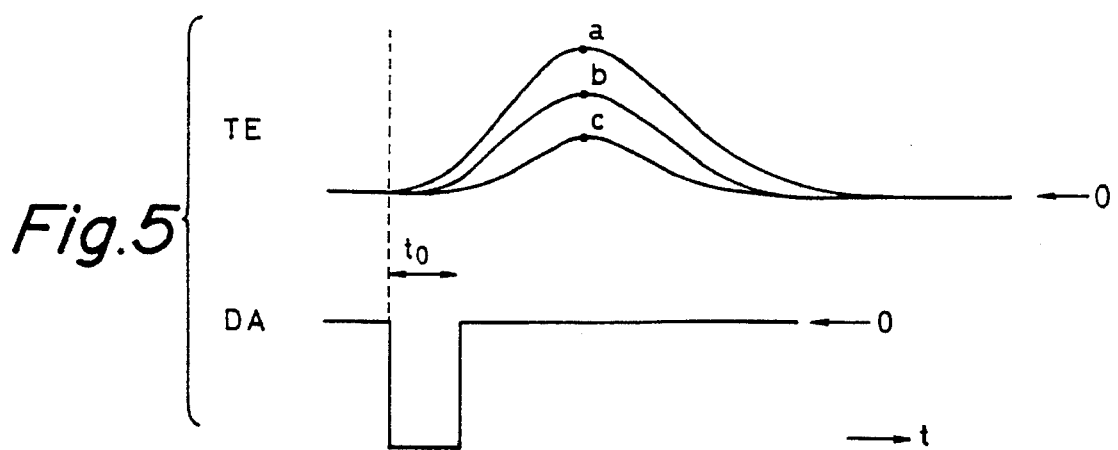
FIG. 5 is a view for explaining changing states of a digital output command signal DA and a tracking error signal TE.

FIG. 5 is a view for explaining changing states of the digital output command signal DA and the tracking error signal TE. Reference numerals TE and DA of signal waveforms in FIG. 5 respectively correspond to those in FIG. 1.

Further, each of reference numerals a to c shows a peak voltage level TEP of the tracking error signal TE.

When the subroutine "ADD PULSE" is executed, the track follow-up servo attains a turning-on state.

Accordingly, when the digital output command signal DA is set to have a negative voltage, a light beam is moved in a direction in which the tracking error signal TE has a positive voltage. When the negative voltage of the command signal DA is continuously applied as a predetermined value the light beam is moved until TE=DA is formed. When TE=DA, a gain of the phase compensating circuit 5 is equal to one.

In FIG. 5, the command signal DA has a pulse time width $t_0$ and the light beam is moved a little slightly after the pulse time $t_0$ in a direction in which the tracking error signal TE has a positive voltage. Then, the light beam again follows up a track.

Such a responsive operation is generally known as an impulse response.

When a loop gain of the track follow-up servo is high, the impulse response of the light beam is made at a high speed so that a responsive level is increased.

In contrast to this, when the loop gain is low, the responsive level is reduced.

Accordingly, the peak level TEP of the tracking error signal TE obtained by the impulse response is provided at point a in FIG. 5 when the loop gain is high. In contrast to this, the peak level TEP is provided at point c in FIG. 5 when the loop gain is low.

Figure 6:
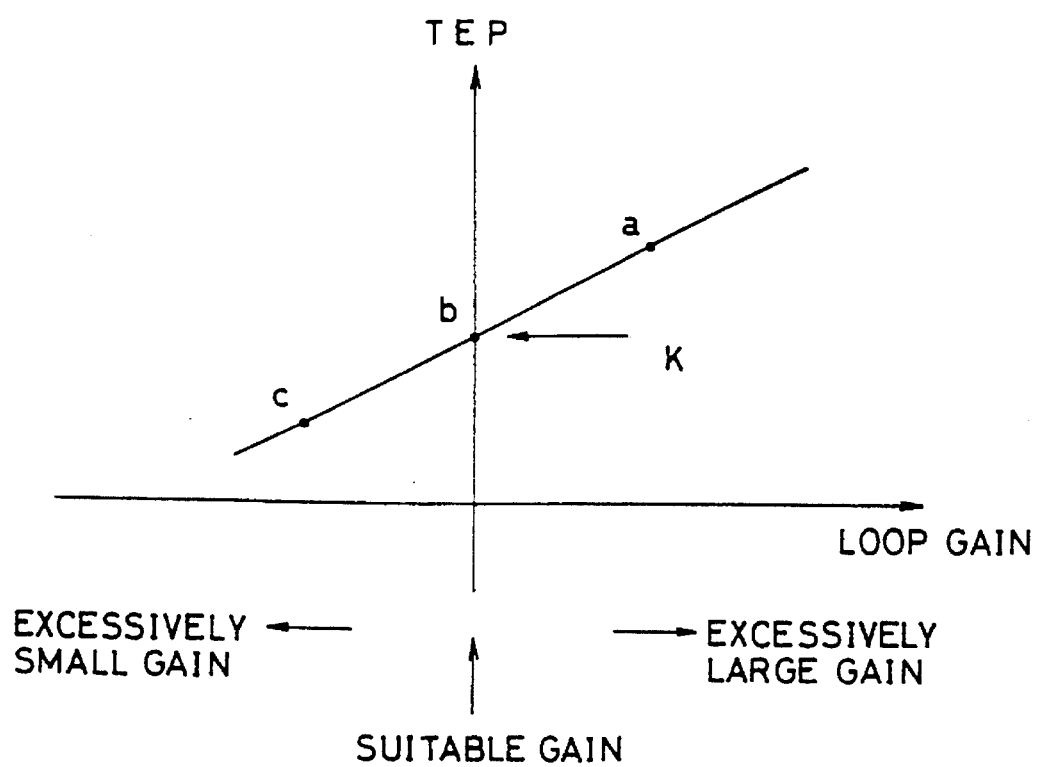
FIG. 6 is a characteristic graph showing one example of the relation between a loop gain and a peak voltage level TEP of the tracking error signal TE.

If the peak level TEP of the tracking error signal TE is provided at point b when the loop gain is set to a suitable value, the relation between the loop gain and the peak level TEP is provided as shown in FIG. 6 when the loop gain is increased or decreased from the suitable value.

FIG. 6 is a characteristic graph showing one example of the relation between the loop gain and the peak level TEP of the tracking error signal TE. In FIG. 6, an axis of abscissa shows the loop gain and an axis of ordinate shows the peak level TEP.

As shown in FIG. 6, the loop gain is approximately increased linearly as the peak level TEP is increased.

Namely, the relation between the loop gain and the peak level TEP is approximately set to at least a monotonous increasing or decreasing relation.

The loop gain can be set to a suitable value if the loop gain is corrected such that the peak level TEP approaches the suitable value b.

In the closed-loop control system and the servo device of the optical disk unit in the present invention, such a point about the above relation is considered and the loop gain is corrected such that the peak level TEP is set to a suitable value.

FIG. 7 is a table showing an operational example of each of the closed-loop control system and the servo device of the optical disk unit in the present invention every one loop using algorithm thereof.

In FIG. 7, a characteristic curve shown in FIG. 6 is set to a straight line and the following formula (2) is supposed.

$$TEP=0.2*(LPG-10)+1 \tag{2}$$

In this formula (2), LPG shows a general loop gain of a track follow-up servo system in FIG. 1.

When LPG=10, the loop gain is set to a suitable value and TEP=1 is formed in measurement and an inclination of the straight line is set to 0.2.

In the above formula (1), G=0.2 and K=1 are formed so that a target value of the TEP is equal to one. Accordingly, the initial value Const1 of the loop gain is set to one.

In FIG. 7, the general loop gain LPG before correction is supposedly set to 15 greater by 50 than a suitable value of 10.

In the case of Loop No.=1 on the left-hand side in FIG. 7, GAIN=1 and LPG=15 are formed. Accordingly, TEP is measured and equal to 2 by the following formula (3) from the formula (2).

$$TEP=0.2*(15-10)+1=2 \qquad (3)$$

The CPU 10 in FIG. 1 makes a calculation of the formula (1) by using this TEP=2 so that the loop gain GAIN at the next time is provided by the following formula (4).

$$\begin{aligned} \text{GAIN (next time)} &= \text{GAIN} + G * (K - TEP) \\ &= 1 + 0.2 * (1 - 2) \\ &= 0.8 \end{aligned} \qquad (4)$$

In the case of Loop No.=2, GAIN=0.8 is formed so that LPG is provided by the following formula (5).

$$LPG=15*0.8=12 \qquad (5)$$

In this case, TEP is measured and provided by the following formula (6).

$$TEP=0.2*(12-10)+1=1.4 \qquad (6)$$

Accordingly, GAIN at the next time is calculated and provided by the following formula (7).

$$\begin{aligned} \text{GAIN (next time)} &= 0.8 + 0.2 * (1 - 1.4) \\ &= 0.72 \end{aligned} \qquad (7)$$

Similarly, the gain GAIN at the next time is determined by the calculation of the formula (1) with respect to the measured TEP. As shown in a final row in FIG. 7, GAIN, LPG and TEP are finally converged and provided as follows.

$$GAIN=10/15=0.666 \qquad (8)$$

$$LPG=0.666*15=10 \qquad (9)$$

$$TEP=1 \qquad (10)$$

Accordingly, the general loop gain LPG is corrected to a suitable value of 10 and the gain correction value GAIN is determined and set to 0.666.

The calculation of the formula (1:) physically means that a subtracted value (K−TEP) obtained by subtracting the measured TEP from the constant K is accumulatively added to the gain correction coefficient GAIN at a predetermined ratio G. In this case, the measured TEP is monotonously increased or decreased as the loop gain is increased or decreased, respectively.

An entire correction loop including such accumulation has the effects of a low frequency region filter. Accordingly, it is possible to restrain the influence of a high frequency noise included in the measured TEP.

Operational simulation results of the algorithm in FIG. 2 will next be explained when a noise is mixed into the measured value of the peak level TEP.

FIG. 8 is a table showing one example of the operational simulation results of the algorithm in FIG. 2 when a noise is mixed into the measured value of the peak level TEP.

In FIG. 8, value +0.1 or −0.1 is added by this noise to the measured value of the peak level TEP every one loop.

The other constant and prerequisite, etc. are similar to those in FIG. 7.

For example, in the case of Loop No.=1, TEP=2 is formed in measurement in FIG. 7. In the case of FIG. 8, value +0.1 is added to this TEP so that TEP=2.1 is obtained in measurement.

Accordingly, the gain correction value GAIN at the next time is calculated and provided by the following formula (11).

$$\begin{aligned} \text{GAIN (next time)} &= 1 + 0.2 * (1 - 2.1) \\ &= 0.78 \end{aligned} \qquad (11)$$

In the case of Loop No.=2, GAIN (at the next time)=0.78 and LPG=15*0.78=11.7 are formed. Accordingly, TEP is measured and provided by the following formula (12).

$$\begin{aligned} TEP &= 0.2 * (11.7 - 10) + 1 - 0.1 \\ &= 1.24 \end{aligned} \qquad (12)$$

The value of "−0.1" in the final term on the right-hand side of this formula (12) means a noise.

When the loop processing is similarly performed, the loop gain LPG is approximately provided within a changing width from 9.75 to 10.25 in the case of a suitable value 10 of the loop gain.

In FIG. 8, the peak level value TEP is changed by ±0.1 by the noise NOISE. This change corresponds to a change ±0.5 in loop gain LPG from the above formula (2).

The reasons for this correspondence are as follows. Namely, the inclination of the straight line in the formula (2) is set to 0.2 so that the peak level value TEP is equal to 1.1 by the following formula (13) with respect to a suitable value of 1 when the loop gain LPG is equal to 10.5 greater by 5% than the suitable value 10.

$$0.2*(10.5-10)+1=1.1 \qquad (13)$$

Accordingly, the loop gain LPG can be corrected with only an accuracy of ±5% when the gain correction value GAIN is changed to simply set the peak level value TEP to one without using any algorithm in the closed-loop control system and the servo device of the optical disk unit in the present invention.

In contrast to this, as mentioned above, when the algorithm of the present invention is used, the loop gain LPG can be corrected with an accuracy of ±2.5% in a range from 9.75 to 10.25.

In other words, it is possible to restrain the influence of a noise mixed into the peak level value TEP by half.

As can be seen from the formula (1), the influence of the noise mixed into the peak level value TEP can be further reduced if a value of the accumulative ratio G is reduced.

Accordingly, the accuracy in correction of the loop gain can be freely improved by changing the value of the accumulative ratio G. Further, it should be easily understood that a convergent speed of this correction can be also controlled.

Such contents mean that the value of the accumulative ratio G can be suitably determined by a condition for correcting the loop gain.

Concretely, the accumulative ratio G is set to a relatively large value in a first correction of the loop gain so as to rapidly correct the loop gain. For example, when the loop gain is changed by a change in actuator constant, etc. caused by a change in temperature and this change in the loop gain is corrected in second and subsequent corrections, the accumulative ratio G is set to a smaller value so that the loop gain can be corrected with high accuracy.

The above embodiment mainly relates to the track follow-up servo of an optical disk. However, the present invention can be clearly applied to all closed-loop control systems having a means for obtaining a measured value of the peak value in at least a monotonous correlation in change between the loop gain and the peak value.

A servo device of an optical disk unit can be applied to an open-loop control system in accordance with a second embodiment of the present invention.

A hard construction of the servo device is similar to that shown in FIG. 1.

In this embodiment, algorithm will be explained when a step jumping operation is performed in the optical disk unit.

In this step jumping operation, a light beam following up a track is jumped onto an adjacent track.

In this second embodiment, the switching circuit 6 in FIG. 1 is turned off so that the track follow-up servo attains an opening state.

A positive constant +C is next added to a value shown by a digital output command signal DA for a constant time $t_2$. Thereafter, a negative constant −C is added to the value shown by the digital output command signal DA for the constant time $t_2$. The switching circuit 6 is then turned on so that the track follow-up servo is again operated in a closing state thereof.

Figure 9:
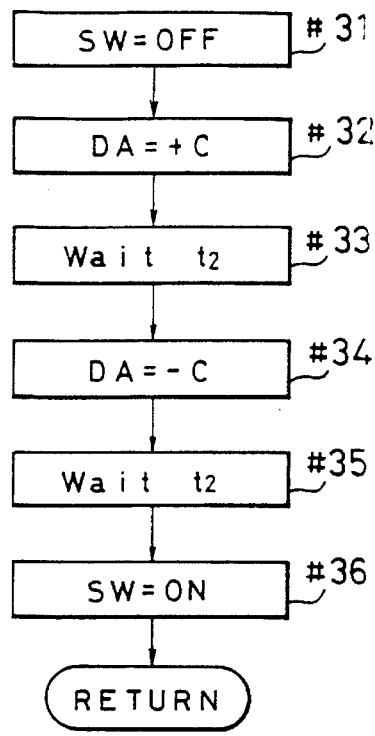
FIG. 9 is a flow chart showing a main processing flow at a control time of a step jump in the central processing unit (CPU) 10 in the servo device of the present invention.

FIG. 9 is a flow chart showing a main processing flow at a control time of the step jumping operation performed by the central processing unit (CPU) 10 in the servo device of the present invention. In FIG. 9, reference numerals #31 to 36 designate processing steps.

In the step #31, a switching control signal SW is set to a turning-off signal so that the track follow up servo attains an opening state.

In the next step #32, a value shown by a digital output command signal DA is set to a positive value +C.

In the step #33, the servo device waits for a constant time $t_2$.

In the step #34, the value shown by the digital output command signal DA is switched to a negative value −C.

In the next step #35, the servo device waits for the constant time $t_2$.

In the step #36, the switching control signal SW is set to a turning-on signal to again operate the tracking follow-up servo, thereby terminating execution of this processing flow in FIG. 9.

The step jumping operation in the optical disk unit is executed by the above processings in the steps #31 to #36.

Changes in the digital output command signal DA in this step jumping operation and a tracking error signal TE will next be described.

Figure 10:
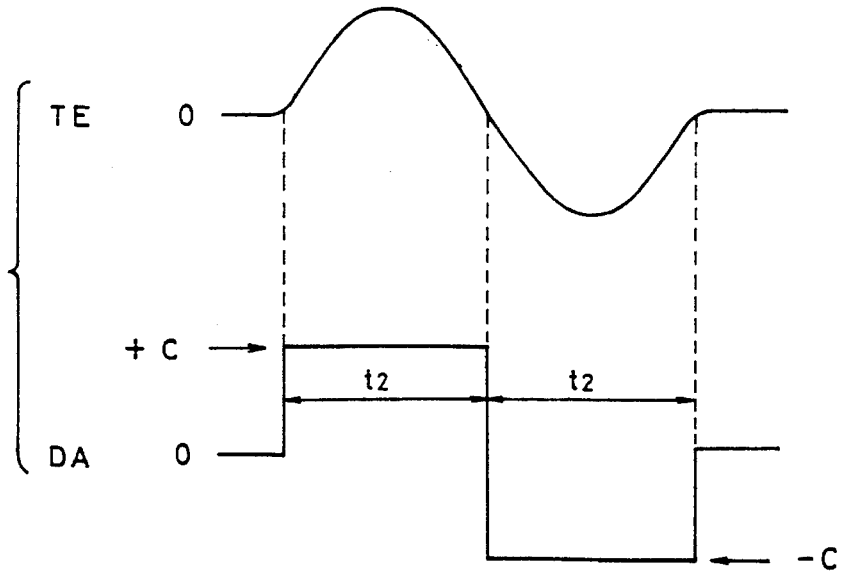
FIG. 10 is a view for explaining changing stakes of the command signal DA and the tracking error signal TE at a step jumping time in the servo device of the optical disk unit in the present invention.

FIG. 10 is a view for explaining changing states of the command signal DA and the tracking error signal TE at a step jumping time in the servo device of the optical disk unit in the present invention.

As can be seen from FIG. 10, a value shown by the command signal DA is first set to a positive value +C and the servo device attains a standby state until a constant time $t_2$ has passed.

In the meanwhile, the tracking error signal TE is changed and set to zero in voltage while this tracking error signal TE has a positive voltage as shown in FIG. 10.

At this time, the value shown by the command signal DA is set to a negative value −C and the servo device again attains a standby state until the constant time $t_2$ has passed.

In this case, the tracking error signal TE is changed and set to zero in voltage while this tracking error signal TE has a negative voltage.

When the voltage of the tracking error signal TE is equal to zero, the command signal DA is set to zero in voltage.

In this second embodiment, a gain correction coefficient GAIN can be definitely determined by the above algorithm shown in FIG. 2 before the step jumping operation. In this case, dispersions in actuator constant, etc. are corrected by this gain correction coefficient GAIN so that the step jumping operation can be accurately executed by only determining the constant C and the time $t_2$ in advance at a step jumping time.

Many widely different embodiments of the present invention may be constructed without departing from the spirit and scope of the present invention. It should be understood that the present invention is not limited to the specific embodiments described in the specification, except as defined in the appended claims.

What is claimed is:

1. A device for automatically correcting a servo loop gain, comprising:

a gain variable means for varying a servo loop gain in accordance with a gain setting value;

an adder for adding a pulse signal having predetermined time width and pulse height to a servo loop being in a closed loop state;

a measuring circuit for measuring a peak value in a tracking error signal related to a distance between a control object and a target position thereof within a predetermined time after the pulse signal is added to the servo loop;

a correction value calculation means for multiplying a difference between the measured peak value and a predetermined value by a predetermined coefficient, thereby to obtain a correction value, said predetermined coefficient being less than one;

a gain update means for updating the gain setting value by adding the correction value to the current gain setting value; and a repetition means for repeating a series of said adding operation of the pulse signal, said measuring operation of the peak value, said calculation operation of the correction value and said updating operation of the gain setting value by a predetermined number of times.

2. A device according to claim 1, wherein said device further comprises a switching circuit for switching an operation state of the servo loop between a closed loop state and an opened loop state, and means for generating an opened loop driving signal by multiplying the gain setting value obtained by the repetition of said series of operations by a predetermined value.

3. A servo device of an optical disk unit for positioning a light beam in a target position on an optical disk, servo device including an optical head for providing a tracking error signal in accordance with an error in position of the light beam from said target position, a servo means for controlling a position of said light beam in accordance with said tracking error signal, and a gain correction means for automatically correcting a servo loop gain of the servo means, said gain correction means comprising:

a gain variable means for varying a servo loop gain in accordance with a gain setting value;

an adder for adding a pulse signal having predetermined time width and pulse height to a servo loop being in a closed loop state;

a measuring circuit for measuring a peak value in the tracking error signal within a predetermined time after the pulse signal is added to the servo loop;

a correction value calculation means for multiplying a difference between the measured peak value and a predetermined value by a predetermined coefficient, thereby to obtain a correction value, said predetermined coefficient being less than one;

a gain update means for updating the gain setting value by adding the correction value to the current gain setting value; and a repetition means for repeating a series of said adding operation of the pulse signal, said measuring operation of the peak value, said calculating operation of the correction value and said updating operation of the gain setting value by a predetermined number of times.

4. A servo device according to claim 3, wherein said gain correction means further comprises a switching circuit for switching an operation state of the servo loop between a closed loop state and an opened loop state, means for generating an opened loop driving signal by multiplying the gain setting value obtained by the repetition of said series of operations by a predetermined value, and an opened loop driving means for controlling a position of the light beam in the opened loop state in accordance with said opened loop driving signal.

5. A servo device as claimed in claim 3, wherein said gain correction means further comprises a switching circuit for switching an operation state of the servo loop between a closed loop state and an opened loop state, means for generating a track jump driving signal by multiplying the gain setting value obtained by the repetition of said series of operations by a predetermined value, and a track jump driving means for controlling a position of the light beam in the opened loop state in accordance with said track jump driving signal thereby to jump the light beam from a current track to a target track.

* * * * *